United States Patent Office 2,926,189
Patented Feb. 23, 1960

2,926,189

ESTERIFICATION OF DIAMMONIUM TEREPHTHALATE WITH GLYCOL

David James Hadley, Epsom Downs, and Harry Davies Hollingworth, Banstead, England, assignors to The Distillers Company Limited, Edinburgh, Scotland, a British company No Drawing. Application May 21, 1957
Serial No. 660,444

Claims priority, application Great Britain June 8, 1956

2 Claims. (Cl. 260—475)

The present invention relates to the production of glycol esters of terephthalic acid and in particular to the conversion of diammonium terephthalate to di(2-hydroxyethyl) terephthalate.

It has already been proposed to produce glycol esters of terephthalic acid by heating a glycol, such as ethylene glycol, with terephthalic acid or a functional derivative thereof, such as diammonium terephthalate. On completion of the reaction the ester can be isolated, or can be converted by further heating into a high molecular weight fibre-forming linear polyester. Hitherto, in the case of the production of di(2-hydroxyethyl) terephthalate from diammonium terephthalate, the reaction has taken place only slowly, and the attainment of high yields of the desired ester in an economically practicable reaction time has not been possible.

We have now discovered that the reaction conditions, and particularly the proportions of reactants, are critical, and that high yields of di(2-hydroxyethyl) terephthalate can be obtained within a reasonable reaction time only if the molar ratio of glycol to ammonium terephthalate is maintained within certain limits.

It is therefore an object of the present invention to provide an improved process for the production of di(2-hydroxyethyl terephthalate from diammonium terephthalate and ethylene glycol, in which high yields of the ester are obtained within a reasonable reaction period.

According to the present invention the process for the production of di(2-hydroxyethyl) terephthalate by heating diammonium terephthalate with ethylene glycol and removing the liberated ammonia is characterised by the use of a molar ratio of glycol to diammonium terephthalate of between 7:1 and 15:1. It is preferred to use a molar ratio of glycol to diammonium terephthalate of between 9:1 and 11:1.

It has been found that by working within the limits specified above not only is the rate of reaction increased, but the amount of di(2-hydroxyethyl) terephthalate produced per hour per unit of reactor volume can be maintained at a very high level.

The reaction is carried out by maintaining the reactants at an elevated temperature while removing the liberated ammonia, preferably continuously, from the reaction mixture. The temperatures used are not critical, and temperatures of between 150° and 250° C. have been found to be suitable. Temperatures outside this range may also be used but at the lower temperatures the rate of reaction is slow, while if temperatures above the boiling point of ethylene glycol at the reaction pressure are used decomposition or polymerisation may take place. It is preferred to carry out the reaction at the temperature of reflux of the reaction mixture at atmospheric pressure; reduced or increased pressure may also be used if desired.

The reaction is desirably carried out in the absence of oxygen, and this may be advantageously effected by passing a stream of an inert gas, such as nitrogen, through the reaction mixture. The inert gas also assists in the removal of the liberated ammonia.

The reaction may be carried out in the absence of any catalyst but it is preferred to add an alkaline catalyst, such as an alkali or alkaline earth metal oxide, hydroxide, alcoholate, carbonate or bicarbonate, or the salts of these metals with weak inorganic or organic acids, for instance the silicates, borates, aluminates, acetates, propionates, stearates, palmitates and oleates. Preferred catalysts include magnesia, sodium methoxide and sodium terephthalate. It is believed that whatever alkaline catalyst is added it exists in the reaction mixture mainly as the terephthalate. Thus sodium hydroxide will be converted to sodium terephthalate. The proportions of catalyst used are not critical and amounts up to 1% based on the weight of the diammonium terephthalate have been found to be suitable.

The duration of the reaction will vary depending on the reaction conditions, particularly the molar ratio of the reactants. The progress of the reaction can be estimated to some extent by the amount of ammonia evolved and by the degree of solution of the diammonium terephthalate in the reaction mixture, but the only accurate method of determining when the reaction is complete is by analysis of the reaction products. The reaction may be carried out continuously or in a batchwise manner. In a preferred embodiment the reaction product is treated for the recovery of the di(2-hydroxyethyl) terephthalate, and the remainder of the reaction mixture, consisting mainly of ethylene glycol is recycled to the reactor, together with further amounts of diammonium terephthalate, ethylene glycol, and catalyst, as necessary.

The di(2-hydroxyethyl) terephthalate may be recovered from the reaction mixture in any suitable way, preferably by cooling and filtering off the precipitated ester. If the reaction has been carried out in the presence of an insoluble catalyst such as magnesia, the precipitated di(2-hydroxyethyl) terephthalate may be recovered free from catalyst by dissolving in a suitable solvent, such as water or an organic solvent, filtering and recrystallising the di(2-hydroxyethyl) terephthalate. If the catalyst is soluble, traces of adsorbed catalyst may be removed by washing the di(2-hydroxyethyl) terephthalate with small amounts of water.

Alternatively, the di(2-hydroxyethyl) terephthalate may be directly converted into high molecular weight linear polyesters by heating the reaction product at temperatures above the boiling point of the ethylene glycol, and under such conditions that the excess glycol is removed from the reaction zone.

The following comparative examples are given further to illustrate the process of the invention.

EXAMPLE 1

31 parts by weight of ethylene glycol, 10 parts by weight of diammonium terephthalate (a molar ratio of glycol to diammonium terephthalate of 10:1) and 0.1 part by weight of sodium methoxide were heated at atmospheric pressure under reflux while passing a stream of nitrogen through the reaction mixture and continuously removing the liberated ammonia. After 5.7 hours analysis of the reaction mixture indicated that the reaction was substantially complete. The reaction mixture was cooled to 80° C. and seeded with crystalline di(2-hydroxyethyl) terephthalate. The ester crystallised out and was filtered off. After being washed with water to remove small amounts of adsorbed catalyst the product had a melting point of 108° C. A second crop of crystals was obtained by concentrating the mother liquors, The yield of di(2-hydroxyethyl) terephthalate (DHET) was 96% based on diammonium terephthalate.

The above process was repeated using different molar ratios of glycol to diammonium terephthalate as shown in Table 1.

When the process of Example 1 was repeated using molar ratios of glycol: diammonium terephthalate outside the range specified for the process of the present invention (runs 6, 7 and 8 in Table 1) the reaction did not proceed to completion, even after 24 hours, and the values for moles DHET produced/hour/litre of reactor volume were very low in comparison with runs 1 to 5 according to the process of the invention.

EXAMPLE 2

The process of Example 1 was repeated using a molar ratio of glycol to diammonium terephthalate of 10:1, but in the absence of an alkaline catalyst. The results are shown in Table 1, run 9.

Table 1

| Run No. | Molar ratio— Glycol: diammonium terephthalate | Reaction time, hours | Yield of DHET, percent by weight on diammonium terephthalate | Moles DHET per hour per litre reactor volume |
|---|---|---|---|---|
| 1 | 15 | 5.5 | 98 | 0.18 |
| 2 | 10 | 5.7 | 96 | 0.24 |
| 3 | 8 | 6 | 45 | 0.124 |
| 4 | 8 | 24 | 95 | 0.066 |
| 5 | 7 | 24 | 85 | 0.065 |
| 6 | 5 | 16 | 15 | 0.021 |
| 7 | 5 | 24 | 15 | 0.014 |
| 8 | 3 | 24 | 15 | 0.019 |
| 9 | 10 | 14 | 95 | 0.095 |

EXAMPLE 3

31 parts by weight of ethylene glycol, 10 parts by weight of diammonium terephthalate (a molar ratio of 10:1), and 0.1 part by weight of sodium methoxide were heated at atmospheric pressure under reflux for 6 hours while a stream of nitrogen was passed through the reaction mixture which continuously removed the liberated ammonia. The reaction mixture was then cooled to 80° C. seeded and the crystallised di(2-hydroxyethyl) terephthalate filtered off and washed as described in Example 1. The mother liquors were mixed with fresh ethylene glycol and diammonium terephthalate to give a molar ratio of glycol to diammonium terephthalate of 10:1, and the mixture was again heated under reflux for 6 hours and the ester recovered. This process was repeated five times, additional catalyst being added as needed. The overall yield of di(2-hydroxyethyl) terephthalate was 95% by weight based on the diammonium terephthalate starting material.

We claim:

1. The process for the production of di(2-hydroxyethyl) terephthalate which comprises reacting diammonium terephthalate and ethylene glycol by heating them together in such relative amounts as to provide a molar ratio of the glycol to the diammonium terephthalate of between 7:1 and 15:1, at a temperature between 150–250° C. at a reaction pressure at least equal to the vapor pressure of ethylene glycol at the reaction temperature, and removing the liberated ammonia.

2. The process as claimed in claim 1 wherein the molar ratio of the glycol to the diammonium terephthalate is between 9:1 and 11:1.

References Cited in the file of this patent

UNITED STATES PATENTS 2,794,794    Schlatter et al. _____ June 4, 1957

FOREIGN PATENTS 610,136    Great Britain _____ Oct. 12, 1948
747,260    Great Britain _____ Mar. 28, 1956